Patented Nov. 4, 1947

2,430,180

UNITED STATES PATENT OFFICE 2,430,180

PROTEINOUS COMPOUND AND THE MANUFACTURE THEREOF

Victor Charles Emile Le Gloahec, Rockland, Maine, assignor to Algin Corporation of America, New York, N. Y., a corporation of Delaware No Drawing. Application December 15, 1941, Serial No. 423,042

31 Claims. (Cl. 252—188.3)

This invention relates to new chemical compounds and to the manufacture thereof. It also relates to the use thereof as emulsifiers.

I have found that under certain critical conditions described hereinbelow, a reaction can be caused to take place between algin and protein to form new chemical compounds that have very valuable properties and uses. I have also found that such compounds may be combined with methyl cellulose ether preferably by reacting protein with both algin and methyl cellulose ether. I have also found more generally that a protein that is below its isoelectric point will react with colloids bearing a negative charge to produce new compounds.

Algin is a complex organic substance contained in various seaweeds such as Laminaria, Phaeophyceae, Macrocystis, Nereocystis and the like. Algin may be recovered from seaweed in several different ways and may, for example, be recovered in a high state of purity according to the method described in Patent No. 2,128,551, applied for by the applicant jointly with John Robert Herter. Algin is also referred to as alginous material. Pure algin is soluble in distilled water but is precipitated if sufficient acid is added to an algin solution. By adding an alkali, precipitated algin can be dissolved. Due to this fact algin is sometimes referred to as insoluble alginic acid and soluble alginate, but as a result of my research in connection with algin, I do not regard this nomenclature as apt in connection with a material such as algin which behaves as a colloid that is insoluble below its isoelectric point and is soluble above its isoelectric point. For this reason, I will refer herein to the material in question by the term "algin," which is the term most generally used in the art. Algin is used extensively for a variety of purposes such as a stabilizer, sizing material, etc., and is a well known article of commerce. It is preferable that algin be used according to this invention in its natural polymerized condition, e. g. as recovered according to said Patent No. 2,128,551.

I have found that if conditions are controlled so that an aqueous mixture of algin and protein is maintained at a pH between the isoelectric point of the algin and the isoelectric point of the protein, the algin and protein will react to form a new and more molecularly complex compound. Due to the complexity of the algin molecule, as well as that of the protein, the nature of the resulting new compound is not precisely known and for this reason I will refer to it as a product of condensation reaction between algin and protein, or more specifically as algino-protein compound.

The isoelectric point of algin and of protein is that point at which the colloid exists in a non-iogenic form and is not attracted, when exposed in aqueous suspension to an electric field, either to an anode or a cathode.

Protein is amphoteric and exists in two forms other than the non-iogenic form depending upon the concentration of hydrogen ions that are present. This may be illustrated in connection with a protein such as gelatin or casein which is at its isoelectric point when it is at a pH of about 4.7. When the concentration of hydrogen ions is higher than that which corresponds to the pH 4.7, the particles carry a positive charge and tend to move toward a cathode and away from an anode. The protein is then sometimes referred to as in acid salt condition, e. g. a chloride, sulphate, acetate, citrate or the like. When the concentration of hydrogen ions is lower than that which corresponds to the pH 4.7, the particles carry a negative charge and tend to move toward an anode and away from a cathode. The protein is then sometimes referred to as being in a metallic salt condition, e. g. sodium caseinate, calcium gelatinate, etc.

The isoelectric point of algin is not the same as that of protein and corresponds to a pH value between about 2 and 3. Above its isoelectric point algin bears a negative charge and is attracted to an anode. When algin is in a substantially pure state, e. g. as recovered according to Patent No. 2,128,551, it is soluble at or slightly above its isoelectric point. When algin is contaminated with impurities, however, its solubility is impaired and impure algin products frequently have to be brought to a pH considerably above 7 to render the same soluble. When the hydrogen ion concentration is increased so that the pH value is below the isoelectric point of algin, the algin, even if pure, coagulates and bears a positive charge. Algin can be obtained in dry form or can be obtained in the form of an aqueous solution, such solution being highly viscous due to inherent characteristics of the algin. The viscosity of the solution of algin is indicative of the concentration of the algin in the solution.

For the purpose of affording a better understanding of my invention, certain examples of the practice thereof will be described. A preferred protein for use in the practice of this invention is gelatine and the preparation of an algino-gelatine compound according to this invention will first be described.

Gelatine as ordinarily produced and obtainable on the market is at a pH substantially above 4.7, namely about 5.2 to 5.4. If about equal parts of such gelatine and algin are mixed together in an aqueous solution, no reaction will occur. However, by adding an acid, e. g., citric acid, to the solution until the pH of the solution is preferably between about 3.5 and about 4, I have found that the algin and the gelatine will react to produce a new chemical compound. The amount of water that is present is not critical and may, for example, be about 10 to 100 times the combined weight of the algin and protein. In this example and as a general rule, the reaction is carried out while the solution is relatively cool; that is, around ordinary atmospheric temperature or somewhat above, but it has been carried out at higher temperatures up to about 100° C.

The sequence of mixing the materials is not of importance. Thus the gelatine can be treated first with an acid to lower its pH to below 4.7, the algin thereafter being added. In this connection, it may be mentioned that gelatine is readily soluble in water, both above its isoelectric point and below its isoelectric point and therefore remains soluble in water even though the pH of the gelatine is lowered below 4.7. Alternatively, it is frequently convenient to prepare in the form of a dry admixture gelatine, algin and citric acid for example, the mixture being such that when added to water the pH of the resulting solution will be about 3.5 to 4. In such case, when the dry admixture is added to water, the reaction between the protein and the algin takes place to form the algino-gelatine compound. It is possible to produce gelatine that has a pH value somewhat below 4.7 and if such a gelatine is obtainable the new compound can be prepared merely by mixing such gelatine with algin and without addition of acid.

Somewhat more generally the reaction to produce the new compound can be caused to take place whenever an aqueous mixture of algin and protein (e. g. gelatine) is produced at a pH that is intermediate the isoelectric point of the algin and the isoelectric point of the protein. Even though the pH is reduced only slightly below the isoelectric point of the protein the reaction will proceed. It is preferable that the reaction be caused to take place at a pH between about 3 and 4.5. The reaction product being a new compound has its own isoelectric point. In the usual case the algino-protein reaction product becomes coagulated below its isoelectric point and bears a positive charge while above its isoelectric point it is soluble and bears a negative charge.

Referring to the foregoing specific example of reacting algin with gelatine, the algino-protein reaction product can be produced either in a coagulated state or in a soluble state, depending upon whether or not the reacting materials result in a composition bearing a negative or a positive charge. When pure algin and pure gelatine are reacted in substantially molar equivalent amounts at a pH of about 3.5, the resulting new compound is substantially at its isoelectric point. If during the reaction the algin is in an excess, even a very slight excess, the negative charge on the excess algin tends to maintain the reaction product in a soluble condition. If, on the other hand, the gelatine is in excess, even a slight excess, the positive charge on the excess gelatine tends to coagulate the reaction product. Control of solubility can also be effected in other ways. Thus, in the case of gelatine and algin, if the reaction is caused to take place at a pH of about 4 to 4.5, the reaction product will be produced in a soluble condition, whereas if the reaction is caused to take place at a pH of around 3 the reaction product will be produced in a coagulated condition. If the reaction product is produced in soluble form it may also be coagulated in other ways than by lowering the pH of the solution. Thus, for example, the reaction product can be precipitated by addition of ethyl alcohol to the solution or other liquid in which the reaction product is insoluble.

The reaction product is a new chemical compound and when caused to occur in a coagulated condition can be washed and dried to produce it in a dry form. One method of producing the new product in pure form is to wash the coagulated product with concentrated ethyl alcohol and then remove the alcohol by drying, the drying preferably being caused to take place under reduced pressure. If the alcohol contains a small amount of alkali, any acidic material can be washed from the algino-protein compound so that it may be recovered in a very pure condition.

A protein such as casein coagulates when the pH is reduced to a value below its isoelectric point, namely, 4.7 in the case of casein. Some proteins other than casein behave similarly. With a protein of this sort, it is possible to first treat it with acid until its pH is below the isoelectric point, thereby coagulating the protein, and then subject the coagulated protein to treatment with an algin solution while maintaining the pH of the mixture between the isoelectric point of the protein and the isoelectric point of the algin, but since the reaction is very slow under such circumstances, it is preferable to proceed in the manner described in connection with the following example.

Algin, e. g. at a pH of 7, is mixed with a soluble casein, e. g. caseinate of sodium at a pH of 7 in sufficient water to dissolve these materials. If the casein is not readily soluble, it can be treated with sufficient alkali to give it desired solubility. There may be present, for example, 70 parts by dry weight of algin and 30 parts by dry weight of the sodium caseinate. Acid, e. g. citric acid, is then added to the solution until the pH of the solution is reduced to about 4.3. By proceeding in this manner, the casein is caused to react with the algin before the casein per se can coagulate and the reaction product, namely, algino-casein is formed in a dissolved condition. In this example above mentioned, the algin is present in slight excess and this tends to maintain the algino-casein in dissolved condition for the reason mentioned hereinabove in connection with the description of the preparation of algino-gelatine. If the casein, instead of the algin, were in slight excess then the algino-casein that is formed would be thrown down in a coagulated state. The algino-casein can, therefore, be produced in a coagulated or in a soluble state. If produced in a coagulated condition the algino-casein coagulum can be filtered and washed and, if desired, dried. It can be put into solution by adding a small amount of alkali to give it a negative charge. When the algino-casein is produced in coagulated condition, it is generally formed when the pH of the mixture is about 4.5 or 4.6, the algin not being in excess.

As a further example of the practice of this invention, egg albumin may be substituted for casein in the preceding example. The pH of the algin and of the egg albumin initially may each be about 6 for example and the pH reduced to about 4.3 to 4.6.

More generally my experiments have led me to believe that proteins as a class may be used according to this invention, the term "protein" being used in a broad sense as including albumins, coagulated proteins, derived proteins and in general as including any nitrogen-containing organic matter which responds to the Biuret reaction and which can be placed in colloidal aqueous solution. Thus the proteins which may be used according to this invention include the simple proteins such as albumins (egg albumin, fresh or dried, blood albumin, etc.), the glutelins (e. g. most of the vegetable albumins, glutelin, oryzenin) and the scileroproteins (e. g. gelatine, collagen). Examples of conjugated proteins are the chromoproteins (e. g. haemoglobin), the nucleoproteins (e. g. nuclein), the phosphoproteins, e. g. casein). Derived proteins may also be used such as the proteoses (e. g. albumose, globulose), the peptones (e. g. soluble peptone) and the peptides. The isoelectric point of ordinarily available proteins such as gelatin, casein and egg albumin, corresponds with a pH value of about 4.7, namely, of the order of 4.5 to 4.9. Thus gelatin ordinarily is at its isoelectric point at a pH of 4.7 but, depending on the source, the pH of gelatin at its isoelectric point may be slightly higher, i. e., substantially 4.8. In the case of casein, its pH at its isoelectric point usually is 4.7 but may be slightly lower, i. e., substantially 4.6. Egg albumin is at its isoelectric point at a pH of substantially 4.9 or slightly lower.

In adjusting the pH of an algin-protein mixture so that the pH of the mixture will be between the isoelectric point of the algin and the isoelectric point of the protein other acids than citric acid may be used. Citric acid has several advantages, however, since it is suitable for use in conjunction with food products and since it can be used in dry solid form. However, such acids as acetic acid, oxalic, tartaric, fumaric, sulphuric, nitric, phosphoric, hydrochloric, etc., may be used. More generally, any acidic material whether organic or inorganic can be used to reduce the pH of the algin-protein mixture to a pH value below the isoelectric point of the protein.

The new algino-protein compound is relatively stable and when dissolved in water carries a negative charge. The product is coagulable in certain liquids such as alcohol and is also coagulable by various soluble metallic salts, e. g., soluble salts of the alkaline earths. The algino-protein compound can be brought to a pH of about 7 or even higher without decomposition, but it has best physical properties for most purposes when the pH is below about 5. The compound when at the pH of its isoelectric point will be soluble if there is present a colloid such as free algin or methyl cellulose ether which carries a negative charge, but is insoluble at the same pH if protein is in excess. The compound, in any event, is soluble when at a pH above its isoelectric point and ordinarily is used in this condition.

One very important use of the new algino-protein compounds is as an emulsifying and stabilizing agent for aqueous emulsions and suspensions. The new compound is very effective for such purposes. The new compound appears to slacken the Brownian movement and to lower the surface tension, both of these factors being highly important in connection with the stability of emulsions. In addition, the new compound appears to be a polar compound having the capacity to orient itself in binary system so as to greatly stabilize such systems. While, as aforesaid, the precise nature of the chemical reaction that occurs between the proteins and the algin is not definitely understood, it is believed that the reaction occurs without reaction upon the carboxyl group that forms a part of the complex algin molecule. In this respect the reaction with the algin molecule is unique and is significant since the important properties of the carboxyl group of the algin molecule are left unimpaired. At the same time the characteristic group of the protein is left unimpaired and is added to the algin residue. In a binary system such as an emulsion of water and fat the carboxyl group of the algin residue is believed to have an affinity for the water particles while the protein residue contains a group, e. g. the group

(wherein R is the balance of the protein residue) which has an affinity for the fat. In such a system, the new compound is believed to have the polar affinities above mentioned which causes the colloidal particles to orient themselves between the water and fat particles and maintain them in a condition of stable emulsion. In any event the new algino-protein compounds have been found to be very effective emulsifying and stabilizing agents, particularly in connection with aqueous emulsions of oleaginous materials, the term "oleaginous materials" being used in a broad sense as covering oils (animal, vegetable or mineral) as well as fats, waxes, etc.

In emulsions that are stabilized using the new compounds of this invention, either the water or the oleaginous material may be the external phase, although those emulsions wherein the water is the external phase are the more stable. Aqueous emulsions of oils such as cod liver oil, mineral oil, or essential oil, may be mentioned as typical. The new product may also be used to stabilize and emulsify the fatty materials in ice cream mixes or chocolate milk products. If the oil and water are present in about equal parts, e. g., 50 parts by weight of water and 50 parts by weight of oil, about 1 part of the new algino-protein compound is very effective as an emulsifying agent. If the proportion of oil is relatively low, e. g., 100 parts of water and 10 parts oil, use of somewhat more of the compound, e. g., aout 2 parts, is usually desirable.

The new algino-protein compounds are also effective in stabilizing aqueous suspensions of solids, e. g., solids such as cacao fiber, pigments, pumice, diatomaceous earth, fuller's earth, calcium carbonate, magnesium carbonate, barium sulphate, graphite and other finely-divided materials which are insoluble or of low solubility in water. In this connection, the term "suspension" is used herein as covering suspensions of either solids or liquids in a liquid, while the term "emulsion" is used in reference to suspension of one liquid in another liquid. In stabilizing suspensions and emulsions, the new product of this invention is much more effective than algin by itself or protein by itself.

For most commercial purposes, e. g., as an emulsifying or stabilizing agent, the algino-protein compound is used in soluble condition. Thus, as a new product, it is preferable that it be made up so that it carries a negative charge, e. g., so that the product will be at a pH slightly above the isoelectric point of the compound. It is also very desirable that the new compound be made up in admixture with some free soluble algin, for, in such case, solubility is insured without the necessity for any substance such as an alkali being present when the compound is at or above its isoelectric point.

Another new product which constitutes a feature of the present invention is a dry mixture containing algin and protein which mixture is at a pH between the isoelectric point of the algin and the isoelectric point of the protein. When such a mixture is added to water the algin and protein immediately react to form the new algino-protein compound. Thus, for example, algin and protein in dry form may be mixed with citric acid, also dry, the pH of the mixture, when added to water, being in the range aforesaid. Such a mixture may be added to an aqueous emulsion and will result in the formation of an algino-protein compound that will act as a stabilizing agent. In such case, it is preferable that in the dry mixture there be a slight excess of algin to insure solubility. Also if the mixture upon addition to water is to result in a solution, the pH of the mixture should not be below the isoelectric point of the algino-protein compound that is formed upon adding the mixture to water and preferably should be slightly above.

The new compound also has other applications. Thus, for example, it may be used in the sizing or finishing of fibrous materials such as paper or fabrics.

In addition to forming a complex algino-protein compound according to this invention, I have found that a still more complex material can be produced by reacting the protein not only with algin but also with methyl cellulose ether, preferably dimethyl cellulose ether. Like algin, methyl cellulose ether in solution carries a negative charge and will react with protein when the protein has a pH value that is below its isoelectric point. When methyl cellulose ether is present in addition to algin in an aqueous mixture which contains protein and which is at a pH below the isoelectric point of protein, the protein will react with both the algin and with the methyl cellulose ether. The combined amount of algin and methyl cellulose ether may, for example, be approximately that amount that will react with the protein. The following is an example.

The following materials are dissolved in about 500 to 1000 parts of water:

| | Parts |
|---|---|
| Algin | 48 |
| Dimethyl cellulose ether | 32 |
| Gelatine | 20 |

The pH of the resulting solution is then reduced by the addition of any acid, e. g. citric acid, until the pH of the solution is about 4.2. The reaction of the protein with the algin and with the dimethyl cellulose ether then takes place. Due to the molecular complexity of the reacting materials it cannot be said definitely whether all of algin and dimethyl cellulose ether are contained in a single complex molecule including the protein residue or whether there is formed a mixture of algino-protein compound together with protein-dimethyl cellulose ether compound. In either event the product is referred to as the reaction product of protein with algin and with dimethyl cellulose ether.

In the foregoing example the relative amounts of algin and dimethyl cellulose ether that are reacted with the protein may be widely varied although it is preferable that the methyl cellulose ether constitute at least about 10% of the combined weight of dimethyl cellulose ether and algin that is reacted with the protein and it is usually preferable, as in the foregoing example, that the total amount of algin and dimethyl cellulose ether be slightly in excess of the amount required to react with the proteins. The method of preparation of the reaction product of protein with algin and methyl cellulose ether may be varied in the different ways above described in connection with algino-protein. Thus the protein, the algin, and the methyl cellulose ether may be mixed together in the dry state to provide a dry mixture which upon incorporation in water has a pH below the isoelectric point of the protein and above the isoelectric point of the algin (an acid such as citric acid may be present to control the pH of the mixture), and the dry mixture added to water.

The product of reaction of protein with algin and with methyl cellulose ether is an excellent emulsifier. This particular product has the advantage of having better physical properties for certain puurposes at a pH around 7 than do algino-protein compounds by themselves. The physical properties of the reaction product of protein with algin and methyl cellulose ether are not affected in any way even when the pH of the product when added to water is increased to about 8. The product may be coagulated, washed, redissolved, etc. in a manner similar to that hereinabove described in connection with algino-protein compounds.

While it is preferable that the methyl cellulose react with the protein some advantage is gained merely by mixing algino-protein compound with methyl cellulose ether. The negative charge of the methyl cellulose ether in such case is of advantage in maintaining the algino-protein compound in solution and also assists to substantial degree in preserving desired physical properties at pH values around 7 or higher.

For the purpose of brevity, the term algino-protein compound is used herein in reference to the product that consists essentially of the product that results from the reaction of protein with algin at a pH between the isoelectric point of the algin and the isoelectric point of the protein. The term product of condensation reaction between algin and protein is used in a broader sense as including not only algino-protein compound but also other products such as products of reaction of protein with algin and dimethyl cellulose ether, namely wherein there may be some other substance or residue present in addition to the algino-protein.

While this invention has been described in connection with certain examples of the practice thereof, it is to be understood that this has been done merely for purposes of illustration and that the scope of this invention is to be governed by the language of the following claims.

I claim:

1. As a new chemical compound a product of condensation reaction between algin and a protein effected in an aqueous medium at a pH between the isoelectric point of the algin and the isoelectric point of the protein.

2. As a new chemical compound product of condensation reaction between algin and gelatin effected in an aqueous medium at a pH between the isoelectric point of the algin and the isoelectric point of the gelatin.

3. As a new chemical compound a product of condensation reaction between algin and casein effected in an aqueous medium at a pH between the isoelectric point of the algin and the isoelectric point of the casein.

4. As a new chemical compound a product of condensation reaction between algin and albumin effected in an aqueous medium at a pH between the isoelectric point of the algin and the isoelectric point of the albumin.

5. An aqueous suspension of substantially water-insoluble material containing in effective amount as an emulsifier a product of condensation reaction between algin and a protein effected in an aqueous medium at a pH between the isoelectric point of the algin and the isoelectric point of the protein, and containing a substance selected from the group consisting of algin and methyl cellulose ether.

6. A composition consisting essentially of a product of condensation reaction in an aqueous medium between algin above its isoelectric point and a protein below its isoelectric point and free algin in sufficient amount to maintain said product of condensation reaction in water-soluble condition.

7. A composition consisting essentially of a product of condensation reaction effected in an aqueous medium between algin above its isoelectric point and a protein below its isoelectric point, and water-soluble methyl cellulose ether in sufficient amount to maintain said product of condensation reaction in water-soluble condition.

8. A composition according to claim 7 wherein said water-soluble methyl cellulose ether is water-soluble dimethyl cellulose ether.

9. As a new chemical compound the product of condensation reaction in an aqueous medium of protein at a pH below its isoelectric point with algin at a pH above its isoelectric point and with water-soluble methyl cellulose ether in solution in the reaction medium.

10. A method comprising reacting algin with a protein in an aqueous mixture having a pH between the isoelectric point of the algin and the isoelectric point of the protein.

11. A method comprising reacting algin with a protein to form a condensation product, the reaction being carried out in an aqueous medium at a pH above about 3 and below about 4.7, the algin being in excess of that required to react with the protein.

12. A method comprising treating a protein in aqueous solution with an acid to lower the pH of the solution to a pH that is below 4.7 and that is above the isoelectric point of algin and reacting said protein with algin dissolved in said solution while said solution is at said pH.

13. A method according to claim 10 wherein the reaction product is coagulated in an acid aqueous medium the pH of which is below the isoelectric point of said product and the coagulum is washed with an alkaline alcohol solution to remove acidity.

14. A method according to claim 12 wherein the algin is mixed with the protein in aqueous solution before the protein is treated with acid to lower its pH.

15. A method comprising reacting algin with a protein to form a condensation product, the reaction being carried out in an aqueous medium at a pH that is below the isoelectric point of said protein and that is above the isoelectric point of the condensation product.

16. A method comprising reacting protein with algin and with dissolved water-soluble methyl cellulose ether in an aqueous mixture that is below the isoelectric point of the protein and that is above the isoelectric point of the algin.

17. A method according to claim 16 wherein said dissolved water-soluble methyl cellulose ether is dissolved water-soluble dimethyl cellulose ether.

18. A method according to claim 16 wherein the combined algin and dissolved water-soluble methyl cellulose ether is in excess of that required to react with the protein.

19. A new chemical compound according to claim 1 consisting essentially of algino-protein.

20. A composition which consists essentially of algin and protein in a dry admixture wherein the algin and protein are unreacted and wherein said algin is present in approximately molar equivalent proportion with respect to said protein, and which upon incorporation in water has a pH above the isoelectric point of the algin and below the isoelectric point of the protein.

21. A composition which consists essentially of algin, protein and citric acid in a dry admixture wherein the algin and protein are unreacted and wherein said algin is present in approximately molar equivalent proportion with respect to said protein, and which upon incorporation in water has a pH above about 3 and below about 4.7.

22. A composition which consists essentially of algin and protein in a dry admixture wherein the algin and protein are unreacted and wherein said algin is present in approximately molar equivalent proportion with respect to said protein, and which upon incorporation in water has a pH that is below the isoelectric point of the protein and that not only is above the isoelectric point of the algin but also is at least at the isoelectric point of the product of condensation reaction in an aqueous medium between said protein below its isoelectric point and said algin above its isoelectric point.

23. A composition which consists essentially of algin and protein in a dry admixture wherein the algin and protein are unreacted and wherein said algin is present in approximately molar equivalent proportion with respect to said protein, and which upon incorporation in water has a pH below the isoelectric point of the protein and above the isoelectric point of the algin and forms a water solution of the product of condensation reaction in an aqueous medium between said algin above its isoelectric point and said protein below its isoelectric point.

24. A composition which consists essentially of a dry admixture of algin, protein and water-soluble methyl cellulose ether wherein the algin, protein and water-soluble methyl cellulose ether are unreacted and wherein the combined algin and water-soluble methyl cellulose ether is present in approximately molar equivalent proportion with respect to said protein, and which upon incorporation in water has a pH above about 3 and below about 4.7.

25. An aqueous suspension of substantially water-insoluble material, said aqueous suspension containing as an emulsifier a product of condensation reaction between algin and a protein effected in an aqueous medium at a pH between the isoelectric point of the algin and the isoelectric point of the protein.

26. An aqueous emulsion of oleaginous material, said aqueous emulsion containing as an emulsifier a product of condensation reaction between algin and a protein effected in an aqueous medium at a pH between the isoelectric point of the algin and the isoelectric point of the protein.

27. An aqueous emulsion of oleaginous material, said aqueous emulsion containing as an emulsifier a product of condensation reaction between algin and gelatin effected in an aqueous medium at a pH between the isoelectric point of the algin and the isoelectric point of the gelatin.

28. An aqueous emulsion of oleaginous material, said aqueous emulsion containing as an emulsifier a product of condensation reaction between algin and casein effected in an aqueous medium at a pH between the isoelectric point of the algin and the isoelectric point of the casein.

29. An aqueous emulsion of oleaginous material, said aqueous emulsion containing as an emulsifier a product of condensation reaction between algin and albumin effected in an aqueous medium at a pH between the isoelectric point of the algin and the isoelectric point of the albumin.

30. An aqueous suspension of substantially water-insoluble material, said aqueous suspension containing as an emulsifier a compound consisting essentially of algino-protein.

31. An aqueous suspension of substantially water-insoluble material, said aqueous suspension containing as an emulsifier a product of condensation reaction in an aqueous medium of protein at a pH below its isoelectric point with algin at a pH above its isoelectric point and with water-soluble dimethyl cellulose ether.

VICTOR CHARLES EMILE LE GLOAHEC.

REFERENCES CITED

The following references are of record in the file of this patent:

UNITED STATES PATENTS

| Number | Name | Date |
|---|---|---|
| 2,278,389 | Ellsworth | Mar. 31, 1942 |